UNITED STATES PATENT OFFICE.

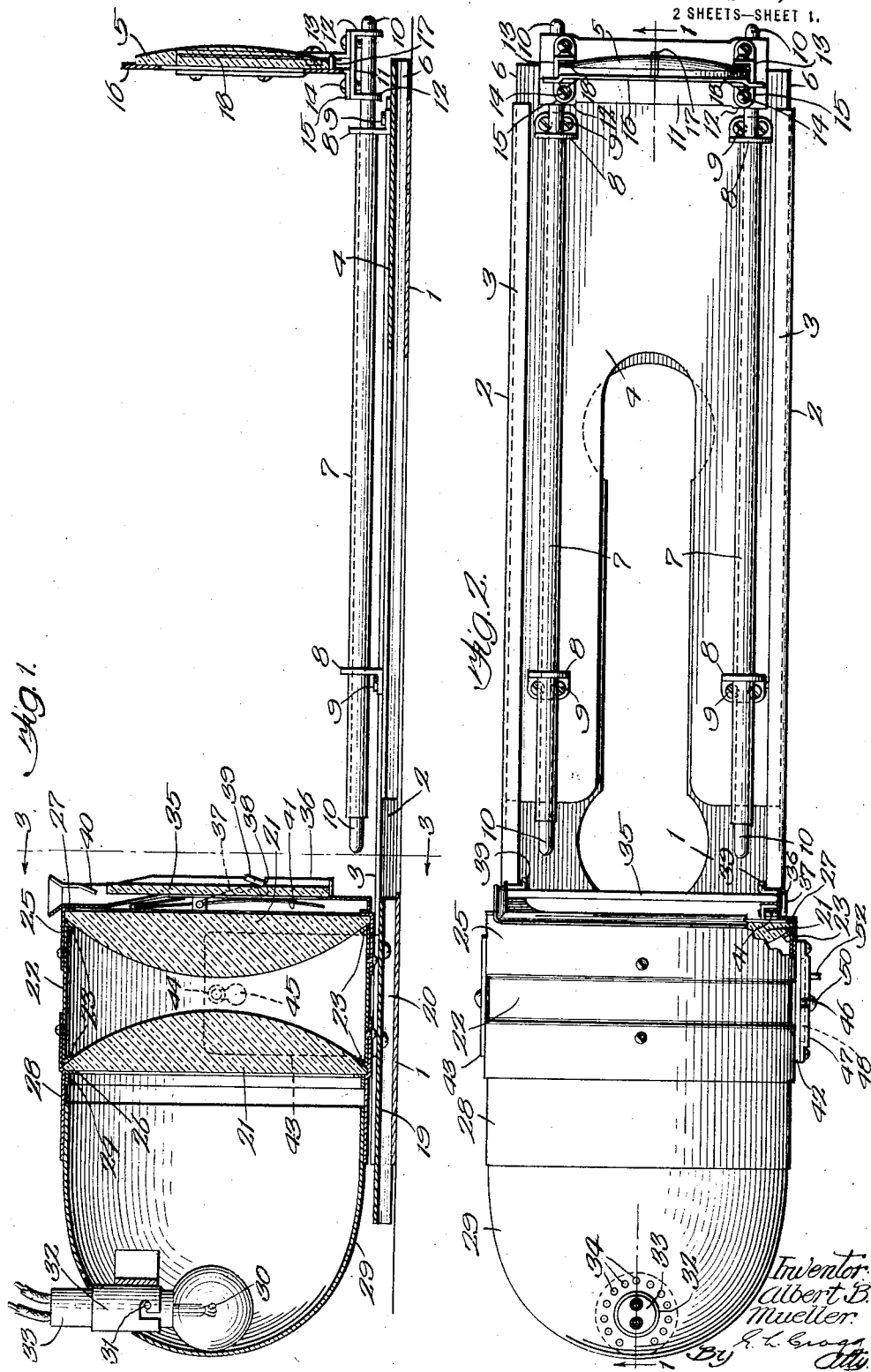

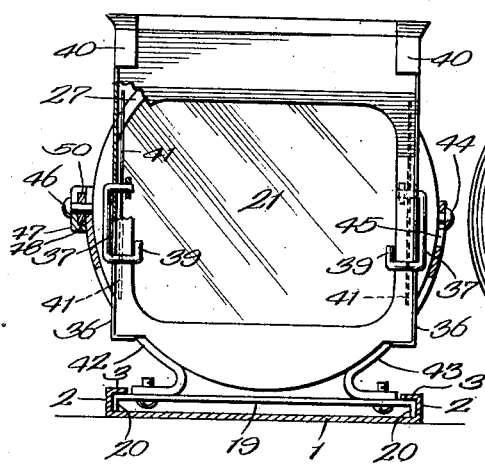

ALBERT B. MUELLER, OF CHICAGO, ILLINOIS.

PICTURE-PROJECTION APPARATUS.

1,389,776.  Specification of Letters Patent.  Patented Sept. 6, 1921.

Application filed January 17, 1919. Serial No. 271,555.

*To all whom it may concern:*

Be it known that I, ALBERT B. MUELLER, citizen of the United States, residing at Chicago, in the county of Cook and State of Illinois, have invented a certain new and useful Improvement in Picture-Projection Apparatus, of which the following is a full, clear, concise, and exact description.

My invention relates to picture projection apparatus and finds a useful embodiment in stereopticons, though the invention is not to be limited to such embodiment.

The invention has a number of objects and advantages in view, one feature of the invention residing in an improved construction of the condensing lens and lamp housing structures whereby both of these structures may be merged into a unitary structure. In practising this feature of the invention I employ a frame for the condensing lens structure having a rearwardly extending portion in separable engagement with the front of the housing whereby the condensing lens structure and the frame therefor constitutes a front wall for the lamp housing and in separable relation therewith.

Another feature of the invention resides in the provision of an improved retaining means for holding picture slides in front of the condensing lens. In practising this feature of my invention I employ a pair of arms that are spring pressed into engagement with the front of the slide that is being held and which arms carry fingers at the front of the slide that are inclined to the plane of the slide to enable the slide readily to be guided into position between the spring pressed arms and the slide holder.

The invention has for another of its objects the provision of an improved means for separably mounting the condensing lens structure, the lamp housing, and the slide holder, and where these three parts are formed into one integral structure one means for separably mounting such structure is employed.

Another feature of the invention resides in an improved construction for positioning the projection lens with respect to the condensing lens and the slide that is in front of the condensing lens, the arrangement which I employ enabling me to secure a wide range of movement of the projection lens with respect to the condensing lens.

Another feature of the invention resides in an improved mounting for the projection lens whereby unframed projection lenses may readily be assembled with the balance of the structure.

I will explain my invention more fully by reference to the accompanying drawings showing the preferred embodiment thereof and in which Figure 1 is a view on line 1—1 of Fig. 2; Fig. 2 is a plan view of the structure shown in Fig. 1; Fig. 3 is a view on line 3—3 of Fig. 1; Fig. 4 is a view illustrating the exterior of the lamp housing, the condensing lens casing, the slide holder formed in one integral structure, and the means whereby such integral structure is separably mounted, a part of the stereopticon below this integral structure being shown in section; Fig. 5 is a detail view showing the separable mounting means illustrated in Fig. 4; the frame portion being shown in section; Fig. 6 is a front view of the structure; Fig. 7 is a view on line 7—7 of Fig. 6; and Fig. 8 is a view on line 8—8 of Fig. 6.

Like parts are indicated by similar characters of reference throughout the different figures.

The base plate 1 is nearly co-extensive with the length of the stereopticon when the stereopticon is adjusted to its shortest length. This base plate has upwardly projecting side walls 2 that are folded over at their upper edges to form the horizontal insetting flanges 3. A base plate 4, that indirectly supports the projection lens 5, has two downwardly projecting side walls 6 substantially to span the gaps between the flanges 3 and the base plate 1 in a manner to permit the base plate 4 to be moved longitudinally of the base plate 1. A pair of sleeves 7 extending longitudinally of the stereopticon is mounted above and upon the base plate 4, these sleeves being desirably rigidly secured to the brackets 8 that, in turn, are fastened to the base plate 4 by means of screws 9. Rods 10 are received within and have telescoping engagement with the sleeves 7. A strut 11 has a pair of depending ears 12 at each end thereof, each rod 10 passing through a pair of ears and being in fixed connection therewith. A vertically grooved upright guide 13 is assembled with the strut 11 at each end thereof by means of screws 14 that pass through ears 15 which project from the bottom ends of the guides 13. A ring 16 is secured to the guides 13 to hold these guides in fixed relation and to support a pin 17 to act as a stop to limit the extent to which the projection lens 5 may be lowered. Leaf springs 18 are secured at their lower ends to the front walls of the grooved guides 13, these springs being under tension to press them at their upper portions against the projection lens that is interposed between these springs and the rear walls of the grooved guides 13. By this construction the projection lens need not be provided with an inclosing frame, lenses taken from stock being adapted for ready assembly with the balance of the stereopticon.

A base plate 19, that indirectly supports the lamp housing, condensing lens and plate holder, has two downwardly projecting side walls 20 substantially to span the gaps between the flanges 3 and the base plate 1 in a manner to permit the base plate 19 to be moved longitudinally of the base plate 1. The frame for the condensing lenses 21 includes an annular or cylindrical portion 22 having insetting flanges 23 for engaging the opposing curved sides of the lenses. Retaining rings 24, 25 are provided at the rear and front ends of the annular portion 22, these rings 24, 25 having insetting flanges 26, 27 that are spaced apart from the flanges 23 to afford annular spaces or pockets to receive the peripheral portions of the lenses 21. The rear ring 24 is secured to and within the cylindrical extension 28 of the ring 22, this cylindrical extension projecting rearwardly from the condensing lens. This cylindrical extension 28 forms a part of the lamp housing, the complemental portion 29 of this lamp housing being preferably telescopically engaged with the cylindrical portion 28 whereby the lamp 30 may readily be focally adjusted. When the portions 28 and 29 are assembled the lamp housing is completed by the condensing lenses and the framework containing them. The lamp is preferably in the form of a small incandescent lamp whose base has bayonet pin and slot connection 31 with the shell 32 which passes through the lamp housing portion 29 and which receives a plug 33 for connecting the lamp in circuit. Ventilating apertures 34 may surround the shell 32. A slide 35 is shown as being supported by the slide holder 36 that is formed in the same integral structure with the frame for the condensing lenses.

Arms 37 are mounted to swing, at their upper ends, where the arms are bent, in the sides of the slide holder 36. The lower ends of these arms are also bent and pass through openings 38 in the sides of the slide holder. The arms 37 carry fingers 39 that are interposed between the sides of the slide holder and which are upwardly inclined with respect to the normal plane of the slide whereby the slide may be readily passed downwardly in front of the part 40 (Fig. 1) of the slide holder and said fingers. Spring means are provided for pressing the fingers against the front face of the slide, this spring means desirably residing in a piece of spring wire 41 that passes through the pivot upon one end of each arm 37 and which is arranged to turn the arms in counter-clockwise direction as the structure is viewed in Fig. 1, whereby the fingers are yieldingly held against the slide. By passing the pieces of spring wire 41 through the arms 37 and suitably engaging the spring wire with the slide holder as indicated in Fig. 1, the arms are turned about the axis defined by their upper ends to press the fingers 39 against the slide.

The composite or unitary structure that embraces the condensing lens frame, the lamp housing, and the slide holder is preferably separably mounted upon the pedestals 42, 43 that are united at their bases with the base plate 19. To this end I desirably fix an outwardly projecting headed pin 44 upon the annular portion 22 of the condensing lens frame, the head of this pin being receivable through the enlarged lower end of a slot 45 in initiating the assembly of the pin 44 with the pedestal 43. Another headed pin 46 is secured to the frame portion 22 opposite the pin 44. The pedestal 42 carries a guideway 47 in which there is a slide 48. This slide has a slot 49 and a hook 50 overhanging a portion of this slot. The shank of the pin 46 is receivable in this slot and normally underlies the hook 50. A spring 51, engaging a pin 52, normally holds the slide 48 in the position indicated in Fig. 5. After the pin 44 has been placed in the slot 45 the shank of the pin 46 is pressed against the top cam face of the hook 50 to force the slide 48 to one side until the shank of the pin 46 has been brought into register with the part of the slot 49 that underlies the hook 50 whereupon the spring 51 will move the slide 48 to the normal position indicated in Fig. 5. When the operation just described has occurred the shank of the pin 44 is received in the narrow upper end of the slot 45 and the lens frame 22 is assembled with the pedestals 42, 43. As the lamp housing and lens holder are formed of one unitary structure with the lens frame portion 22 it follows that the lamp housing and lens holder are also assembled with the pedestals 42, 43 by the same construction that is employed to assemble the lens frame 22 with said pedestals.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

A stereopticon including a condensing lens structure; a lamp housing; a slide holder; a projection lens; a base plate upon which the aforesaid condensing lens structure, lamp housing and slide holder are mounted; a pair of rods extending longitudinally of the stereopticon upon which the projection lens is mounted; a pair of sleeves in telescoping engagement with said rods; another base plate in which said sleeves are mounted; and a third base plate supporting the aforesaid base plates that have sliding engagement with the third base plate longitudinally of the stereopticon.

In witness whereof, I hereunto subscribe my name this sixth day of December A. D., 1918.

ALBERT B. MUELLER.